United States Patent
Kondo et al.

(10) Patent No.: US 12,436,336 B2
(45) Date of Patent: Oct. 7, 2025

(54) OPTICAL SCANNING ELEMENT

(71) Applicant: NGK Insulators, Ltd., Nagoya (JP)

(72) Inventors: Jungo Kondo, Miyoshi (JP); Kentaro Tani, Nagoya (JP); Keiichiro Asai, Nagoya (JP); Tomoyoshi Tai, Inazawa (JP)

(73) Assignee: NGK INSULATORS, LTD., Nagoya (JP)

( * ) Notice: Subject to any disclaimer, the term of this patent is extended or adjusted under 35 U.S.C. 154(b) by 216 days.

(21) Appl. No.: 18/060,032

(22) Filed: Nov. 30, 2022

(65) Prior Publication Data
US 2023/0103702 A1 Apr. 6, 2023

Related U.S. Application Data

(63) Continuation of application No. PCT/JP2021/025816, filed on Jul. 8, 2021.

(30) Foreign Application Priority Data

Jul. 20, 2020 (JP) ................. 2020-123752

(51) Int. Cl.
*G02B 5/18* (2006.01)
*G02B 6/122* (2006.01)
(Continued)

(52) U.S. Cl.
CPC ............ *G02B 6/1225* (2013.01); *G02B 5/18* (2013.01); *G02B 6/34* (2013.01); *G02F 1/295* (2013.01);
(Continued)

(58) Field of Classification Search
CPC ........ G02B 5/18; G02B 6/1225; G02B 6/293; G02B 6/32; G02B 6/34; G02B 2006/1204;
(Continued)

(56) References Cited

U.S. PATENT DOCUMENTS 6,738,551 B2 * 5/2004 Noda ................. G02B 6/12007
385/130
7,050,471 B2 * 5/2006 Brick .................... B82Y 20/00
372/75
(Continued)

FOREIGN PATENT DOCUMENTS

CN 104570404 A 4/2015
JP 2005-084290 A 3/2005
(Continued)

OTHER PUBLICATIONS

Baba et al., Machine Translation of WO-2018186471-A1 (PCT/JP2018/014586). (Year: 2018).*
(Continued)

*Primary Examiner* — Ryan A Lepisto
(74) *Attorney, Agent, or Firm* — BURR PATENT LAW, PLLC

(57) ABSTRACT

Provided is an optical scanning element, which has a large scan angle, is quickly responsive, and can be downsized. The optical scanning element includes: a photonic crystal layer having holes periodically formed in an electro-optical crystal substrate; a line-defect optical waveguide formed in the photonic crystal layer; a diffraction grating arranged in at least one portion selected from an upper portion, a left side surface portion, and a right side surface portion of the optical waveguide; and electrodes arranged on a left side and a right side of the optical waveguide. The optical scanning element is configured so that an emission angle of light emitted from an upper surface of the optical waveguide is changed.

7 Claims, 11 Drawing Sheets

(51) Int. Cl.
- *G02B 6/34* (2006.01)
- *G02F 1/03* (2006.01)
- *G02F 1/295* (2006.01)
- *G02B 6/12* (2006.01)
- *G02B 6/293* (2006.01)
- *G02B 6/32* (2006.01)

(52) U.S. Cl.
CPC ............... *G02B 2006/1204* (2013.01); *G02B 2006/12042* (2013.01); *G02B 2006/12045* (2013.01); *G02B 2006/12107* (2013.01); *G02B 2006/1213* (2013.01); *G02B 6/293* (2013.01); *G02B 6/32* (2013.01); *G02B 2207/101* (2013.01); *G02F 1/03* (2013.01); *G02F 2201/305* (2013.01); *G02F 2202/20* (2013.01); *G02F 2202/32* (2013.01)

(58) Field of Classification Search
CPC ........... G02B 2006/12042; G02B 2006/12045; G02B 2006/12107; G02B 2006/1213; G02B 2207/101; G02F 1/03; G02F 1/295; G02F 2201/305; G02F 2202/20; G02F 2202/32

See application file for complete search history.

(56) References Cited

U.S. PATENT DOCUMENTS

| | | | |
|---|---|---|---|
| 7,058,095 B2* | 6/2006 | Mahnkopf | H01S 5/06255 372/98 |
| 7,123,804 B2 | 10/2006 | Baba et al. | |
| 7,181,120 B2* | 2/2007 | Sugitatsu | G02B 6/1225 385/125 |
| 7,200,312 B2* | 4/2007 | Furuya | B82Y 20/00 385/132 |
| 7,242,839 B2 | 7/2007 | Sakai et al. | |
| 7,254,154 B2* | 8/2007 | Thedrez | H01S 5/12 372/99 |
| 7,310,182 B2 | 12/2007 | Salib | |
| 7,660,506 B2* | 2/2010 | Mitomi | B82Y 20/00 385/132 |
| 8,002,998 B2 | 8/2011 | Iwata et al. | |
| 9,239,424 B2* | 1/2016 | Czornomaz | H01L 33/005 |
| 9,513,436 B2* | 12/2016 | Czornomaz | H01L 31/02327 |
| 9,632,247 B2* | 4/2017 | Fujita | G02B 6/1225 |
| 11,079,541 B2* | 8/2021 | Baba | G01N 21/49 |
| 11,418,008 B2* | 8/2022 | Kim | H01S 5/4062 |
| 11,448,729 B2 | 9/2022 | Baba et al. | |
| 2005/0152659 A1 | 7/2005 | Baba et al. | |
| 2006/0227830 A1* | 10/2006 | Keady | F03H 1/0081 372/39 |
| 2012/0072931 A1* | 3/2012 | Imada | G11B 5/314 |

FOREIGN PATENT DOCUMENTS

| | | |
|---|---|---|
| JP | 2005-181950 A | 7/2005 |
| JP | 2005-274840 A | 10/2005 |
| JP | 2006-126527 A | 5/2006 |
| JP | 2007-523382 A | 8/2007 |
| JP | 2008-052108 A | 3/2008 |
| JP | 4208754 B2 | 1/2009 |
| WO | 2017/126386 A1 | 7/2017 |
| WO | 2018/003852 A1 | 1/2018 |
| WO | WO-2018186471 A1 * | 10/2018 ............... G02F 1/29 |

OTHER PUBLICATIONS

Tomoki Tatebe, et al., "Surface Diffraction Grating Loaded Photonic Crystal Slow Light Beam Steering Device," *The 77th JSAP Autumn Meeting,* Book of Abstracts, Sep. 2016, pp. 03-96.

Toshihiko Baba, et al., "A Study on Silicon Photonics Slow-Light LiDAR," *The 77th JSAP Autumn Meeting Book of Abstracts,* Sep. 2016, pp. 03-192.

International Search Report and Written Opinion (Application No. PCT/JP2021/025816) dated Oct. 5, 2021.

Includingli, Jian et al., "*Tunable negative refraction based on the Pockels effect in two-dimensional photonic crystals composed of electro-optic crystals*", Journal of Applied Physics, vol. 101 pp. 013516-1-013516-5, Jan. 11, 2007.

Japanese Office Action (with English translation) dated Dec. 20, 2022 (Application No. 2021-566501).

English translation of the International Preliminary Report on Patentability (Chapter I) dated Jan. 24, 2023 (Application No. PCT/JP2021/025816).

* cited by examiner

OPTICAL SCANNING ELEMENT

CROSS-REFERENCE TO RELATED APPLICATIONS

This application is a continuation under 35 U.S.C. 120 of International Application PCT/JP2021/025816 having the International Filing Date of 8 Jul. 2021 and having the benefit of the earlier filing date of Japanese Application No. 2020-123752, filed on 20 Jul. 2020. Each of the identified applications is fully incorporated herein by reference.

BACKGROUND OF THE INVENTION

Technical Field

The present invention relates to an optical scanning element.

Background Art

Along with the progress of multimedia and digital signage, there has been a growing demand for a high-definition, high-image quality, and large-screen display or projector, and hence the development of an optical scanning element for scanning an object with laser light at a wide angle has become active. In recent years, an investigation has been made on the application of the optical scanning element to an obstacle-detecting system or a ranging system for the automatic operation control of an automobile or for the position control of a robot or a drone because the element can be used as a laser radar, a laser scanner, or light detection and ranging (LIDAR). A light deflector obtained by arranging a radiation mechanism on a silicon photonic crystal waveguide has been proposed as an example of the optical scanning element (Patent Literatures 1 to 4). However, such light deflector has such a configuration that its deflection angle is changed for each wavelength or the deflection angle is changed by heating the element. Accordingly, when the light deflector is used in such applications as described above, its scan angle is not sufficient. In addition, the light deflector of such a type that its deflection angle is changed for each wavelength involves a problem in that a plurality of light sources having different wavelengths are required, and the light deflector of such a type as to be heated involves a problem in that its response is slow.

CITATION LIST

Patent Literature

[PTL 1] WO 2017/126386 A1
[PTL 2] WO 2018/003852 A1
[PTL 3] WO 2018/186471 A1
[PTL 4] JP 4208754 B2

SUMMARY OF THE INVENTION

A primary object of the present invention is to provide an optical scanning element, which has a large scan angle, is quickly responsive, and can be downsized.

Solution to Problem

According to one embodiment of the present invention, there is provided an optical scanning element, including: a photonic crystal layer having holes periodically formed in an electro-optical crystal substrate; a line-defect optical waveguide formed in the photonic crystal layer; a diffraction grating arranged in at least one portion selected from an upper portion, a left side surface portion, and a right side surface portion of the optical waveguide; and electrodes arranged on a left side and a right side of the optical waveguide. The optical scanning element is configured so that an emission angle of light emitted from an upper surface of the optical waveguide is changed.

In one embodiment, the optical scanning element further includes: a support substrate arranged below the electro-optical crystal substrate, the support substrate being configured to support the electro-optical crystal substrate; a joining portion configured to integrate the electro-optical crystal substrate and the support substrate with each other; and a cavity defined by a lower surface of the electro-optical crystal substrate, an upper surface of the support substrate, and the joining portion.

In one embodiment, the optical scanning element further includes a clad layer arranged on an upper surface of the photonic crystal layer, wherein the diffraction grating is arranged in a portion on an upper surface of the clad layer corresponding to the optical waveguide.

In one embodiment, the diffraction grating has a plurality of grating grooves extending in a direction substantially perpendicular to a waveguide direction of the optical waveguide.

In one embodiment, the optical waveguide has a length of 5 mm or less.

In one embodiment, the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

In one embodiment, the electrodes are transparent to light, and are arranged above the photonic crystal layer so as to overlap the holes.

Advantageous Effects of Invention

According to the embodiment of the present invention, in the optical scanning element, the photonic crystal layer having holes periodically formed in the electro-optical crystal substrate and a predetermined diffraction grating are used in combination. Accordingly, there can be achieved the optical scanning element, which has a large scan angle, is quickly responsive, and can be downsized.

DESCRIPTION OF EMBODIMENTS

Embodiments of the present invention are described below. However, the present invention is not limited to these embodiments. The term "left side" or "right side" as used herein means a left side or a right side with respect to the waveguide direction of an optical waveguide (direction in which light travels in the optical waveguide).

A. Overall Configuration and Operation of Optical Scanning Element

A-1. Overall Configuration

Figure 1:
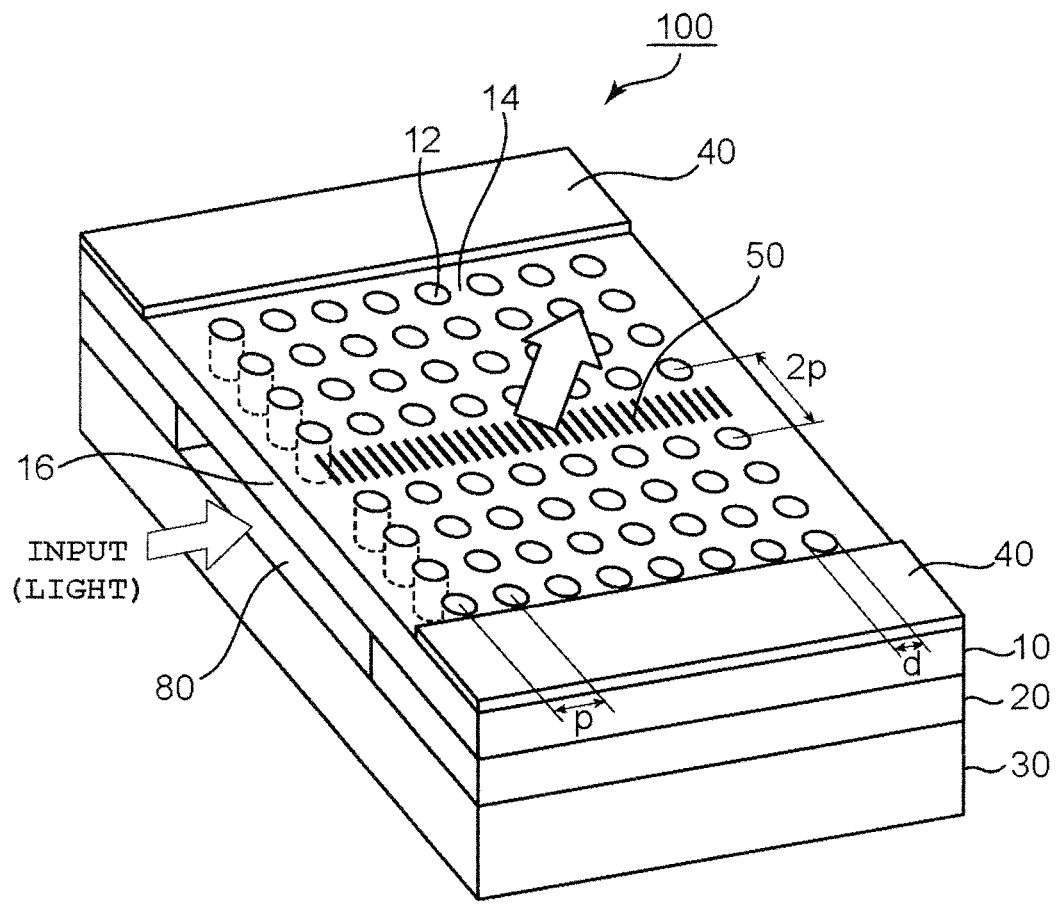
FIG. 1 is a schematic perspective view of an optical scanning element according to one embodiment of the present invention.
Figure 2:
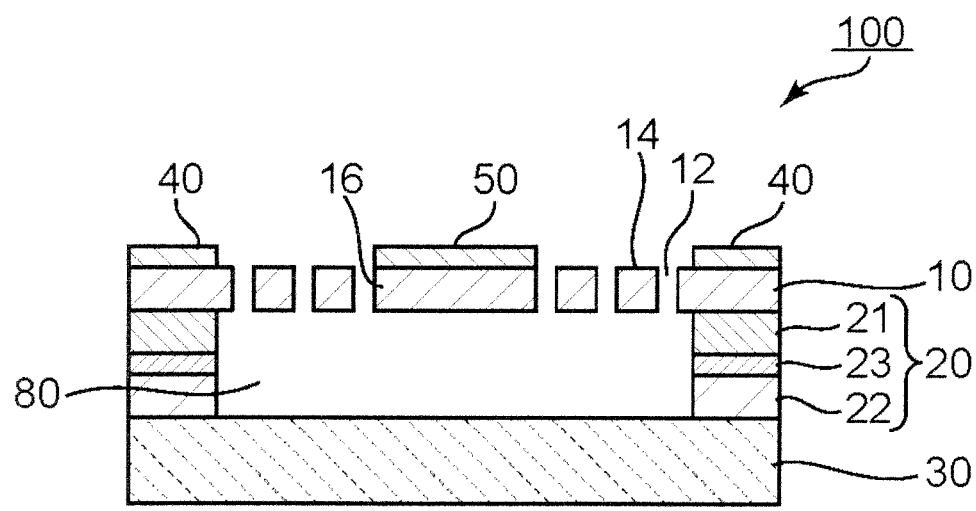
FIG. 2 is a schematic sectional view of the optical scanning element of FIG. 1.

FIG. 1 is a schematic perspective view of an optical scanning element according to one embodiment of the present invention, and FIG. 2 is a schematic sectional view of the optical scanning element of FIG. 1. An optical scanning element 100 of the illustrated example includes: a photonic crystal layer 10 having holes 12 periodically formed in an electro-optical crystal substrate; an optical waveguide 16 defined as a portion in the photonic crystal layer 10 where the holes 12 are not formed (i.e., serving as a line defect formed in the photonic crystal layer); a diffraction grating 50 arranged in the upper portion, and/or left side surface portion, and/or right side surface portion of the optical waveguide 16; and electrodes 40 and 40 arranged on the left side and right side of the optical waveguide 16. In one embodiment, like the illustrated example, the optical scanning element 100 may further include: a support substrate 30 arranged below the electro-optical crystal substrate (photonic crystal layer) 10, the support substrate being configured to support the electro-optical crystal substrate (photonic crystal layer) 10; a joining portion 20 configured to integrate the electro-optical crystal substrate (photonic crystal layer) 10 and the support substrate 30 with each other; and a cavity 80 defined by the lower surface of the electro-optical crystal substrate (photonic crystal layer) 10, the upper surface of the support substrate 30, and the joining portion 20. The optical scanning element 100 is configured so that the emission angle of light emitted from the upper surface of the optical waveguide 16 is changed by a voltage applied between the electrodes 40 and 40.

Any appropriate configuration may be adopted as the diffraction grating 50 as long as light can be emitted from the upper surface of the optical waveguide 16. For example, the diffraction grating may be flat, may be uneven, or may utilize a hologram. In the case of a flat diffraction grating, the pattern of the diffraction grating is formed by, for example, a refractive index difference, and in the case of an uneven diffraction grating, the pattern of the diffraction grating is formed by, for example, a groove or a slit. Typical examples of the pattern of the diffraction grating include a stripe, a lattice, a dot, and a specific shape (e.g., a star shape). The directions and pitch of the stripes, the arrangement pattern of the dots, and the like may be appropriately set in accordance with purposes. In one embodiment, the diffraction grating 50 has a plurality of grating grooves extending in a direction substantially perpendicular to the waveguide direction of the optical waveguide 16. That is, in one embodiment, the diffraction grating has a stripe pattern substantially perpendicular to the waveguide direction of the optical waveguide.

The diffraction grating 50 may be formed over the entirety in the waveguide direction of the optical waveguide 16, or may be formed in a predetermined region along the waveguide direction of the optical waveguide 16. The number of the predetermined regions may be one, or two or more. The ratio of the length of the diffraction grating to the length of the optical waveguide is preferably from 10% to 90%, more preferably from 20% to 80%. When the ratio of the length falls within such ranges, the transverse mode shape of light can be stabilized in a portion in the optical waveguide where the diffraction grating is not arranged. Thus, the light can be satisfactorily emitted from the upper surface of the optical waveguide by a diffraction effect in the diffraction grating region. In addition, a diffracted light pattern having satisfactory symmetry can be achieved, and hence emitted light that has a smooth intensity distribution and is free of any ripple can be obtained. The formation position of the diffraction grating in the lengthwise direction of the optical waveguide may be appropriately set in accordance with purposes. The formation position of the diffraction grating may be determined in accordance with, for example, a circuit to which the optical scanning element is connected and a method for the bonding therebetween.

The diffraction grating 50 may be preferably arranged only directly above the optical waveguide (the diffraction grating may be formed on the electro-optical crystal substrate, or may be formed separately from the electro-optical crystal substrate, or both of these actions may be performed simultaneously). With such configuration, the diffraction grating and guided light can effectively interact with each other, and as a result, extremely excellent diffraction efficiency can be achieved.

The electrodes 40 and 40 may be arranged at any appropriate positions on the left side and right side of the optical waveguide 16 as long as the performance of the optical waveguide 16 is not adversely affected. The electrodes 40 and 40 are typically arranged on the upper surfaces of the left-side end portion and right-side end portion of the photonic crystal layer (electro-optical crystal substrate) 10.

Figure 3:
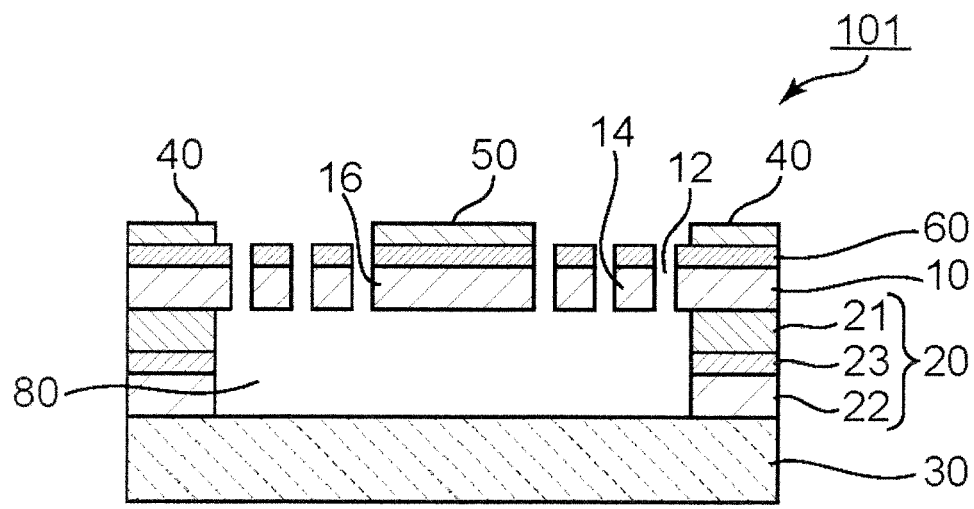
FIG. 3 is a schematic sectional view of an optical scanning element according to another embodiment of the present invention.

FIG. 3 is a schematic sectional view of an optical scanning element according to another embodiment of the present invention. An optical scanning element 101 of the illustrated example further includes a clad layer 60 arranged on the upper surface of the photonic crystal layer 10. In this embodiment, the diffraction grating 50 is arranged in a portion on the upper surface of the clad layer 60 corresponding to the optical waveguide 16, and the electrodes 40 and 40 are arranged on the upper surfaces of the clad layer 60 formed in the left-side end portion and right-side end portion of the photonic crystal layer (electro-optical crystal substrate) 10. The clad layer 60 may be formed only between each of the electrodes 40 and the electro-optical crystal substrate (photonic crystal layer) 10, or may be formed only directly above the optical waveguide 16.

Figure 11:
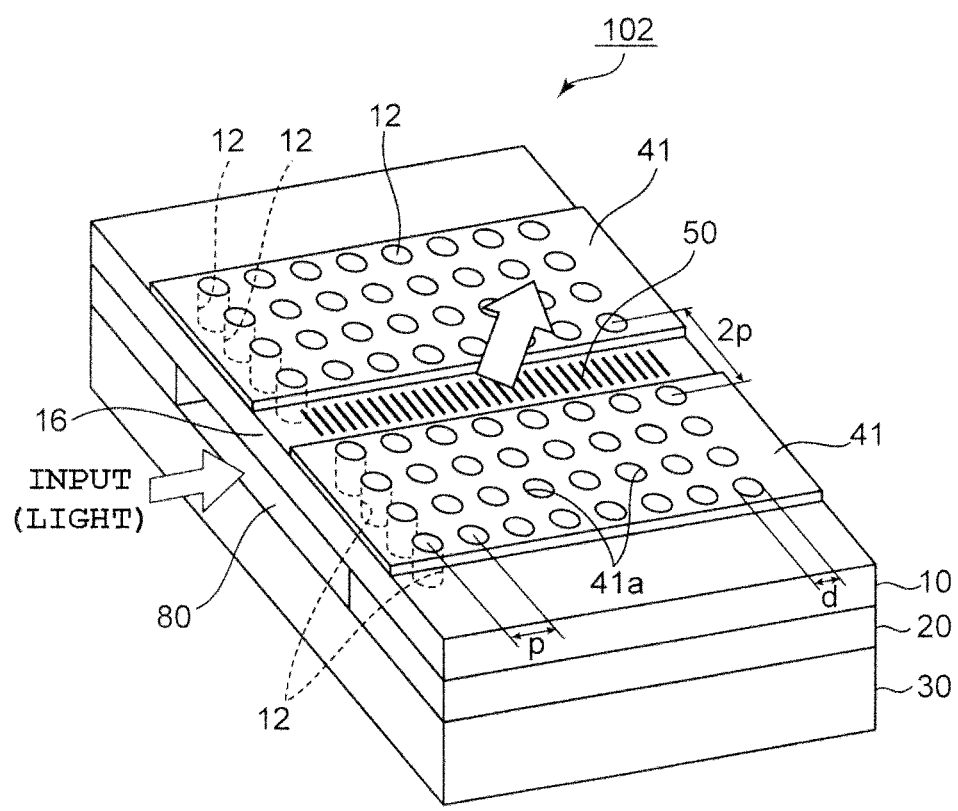
FIG. 11 is a schematic perspective view of an optical scanning element according to still another embodiment of the present invention.
Figure 12:
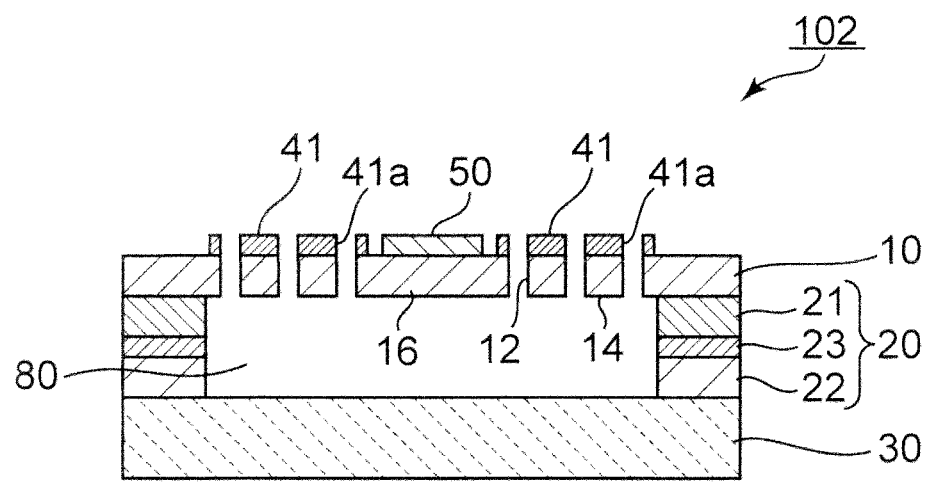
FIG. 12 is a schematic sectional view of the optical scanning element of FIG. 11.

FIG. 11 is a schematic perspective view of an optical scanning element according to still another embodiment of the present invention, and FIG. 12 is a schematic sectional view of the optical scanning element of FIG. 11. In an optical scanning element 102 of the illustrated example, electrodes 41 are transparent to light, and are arranged above the photonic crystal layer (electro-optical crystal substrate) 10 so as to overlap the holes 12. The electrodes 41 and 41 are typically arranged on the upper surface of the photonic crystal layer (electro-optical crystal substrate) 10 so as to sandwich the diffraction grating 50 therebetween.

The term "optical scanning element" as used herein encompasses both of a wafer (optical scanning element wafer) having formed thereon at least one optical scanning element and a chip obtained by cutting the optical scanning element wafer.

First, the operation of the optical scanning element is described, and specific configurations of the respective constituents of the optical scanning element and a production method therefor are described later in the section B to the section I.

A-2. Operation

Figure 4:
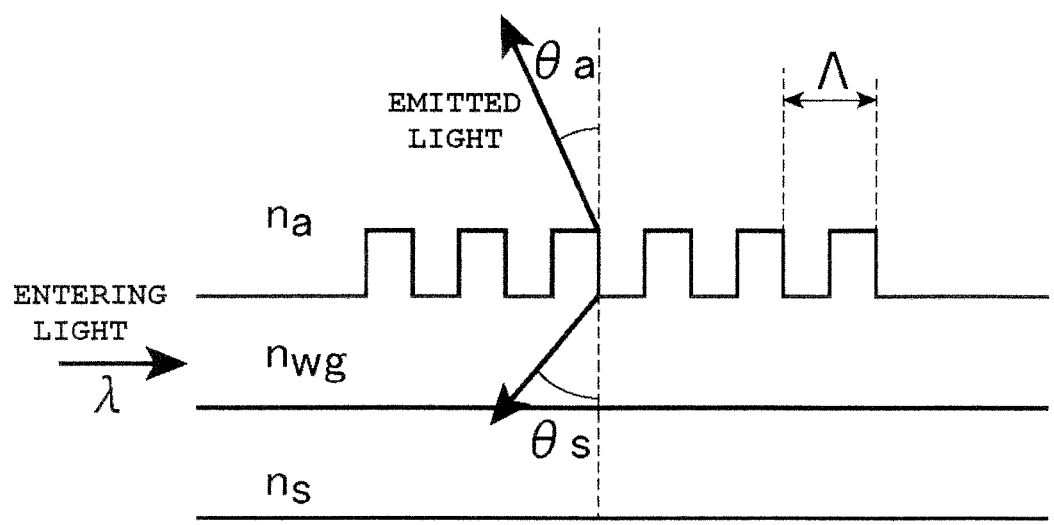
FIG. 4 is a schematic sectional view for illustrating the propagation and emission (radiation) of light in a diffraction grating that may be used in the optical scanning element according to the embodiment of the present invention.

At the time of the operation of the optical scanning element, light is caused to enter from the entering surface of the optical waveguide 16. Herein, the entering light is described. Laser light oscillating at a single wavelength, the laser light being used for LiDAR, may be used as the entering light. The longitudinal mode of the laser light may be a multimode or a single mode, and the transverse mode thereof may be a multimode or a single mode. Each of the longitudinal mode and transverse mode of the laser light is preferably a single mode. Such configuration can suppress the spread of the laser light, and hence can improve a spatial resolution. While the entered light propagates in the optical waveguide 16, diffracted light is emitted from the upper surface of the element by the action of the diffraction grating 50. The action is described in more detail with reference to FIG. 4. FIG. 4 is a schematic sectional view for illustrating the propagation and emission (radiation) of the light in the diffraction grating. In one embodiment, as described above, the diffraction grating has the plurality of grating grooves extending in the direction substantially perpendicular to the waveguide direction of the optical waveguide 16. The diffraction grating of the illustrated example is a grating pattern in a direction perpendicular to the direction of the waveguide in plan view, and in a section along the direction of the waveguide, for example, a protruding portion having a width of Λ/2 and a slit having a width of Λ/2 are alternately formed. In the slit portion, the optical waveguide below the diffraction grating is exposed. The width A of a repeating unit formed of the protruding portion and the slit is defined as the period (pitch) of the diffraction grating. A ratio between the width of the protruding portion and the width of the slit is not particularly limited, and preferably falls within the range of from 1/9 to 9/1. The light that has entered the optical waveguide 16 propagates in the waveguide direction at, for example, a propagation constant $\alpha_0$. In the diffraction grating having the period A, light having a propagation constant satisfying a phase condition represented by the following equation (1) propagates:

$$\beta_q = \beta_0 + qk (q=0, \pm 1, \pm 2, \ldots) \quad (1)$$

where $\beta_0$ represents the propagation constant of a waveguide mode in the optical waveguide when no diffraction grating is present, and K is represented by the following equation.

$$K = 2\pi/\Lambda$$

When an order "q" satisfying the following formula is present, the light may be emitted (radiated) toward both the upper side and lower side of the optical waveguide:

$$|\beta_q| < n_a \cdot k \text{ or } |\beta_q| < n_s \cdot k$$

where $n_a$ and $n_s$ represent the refractive indices of the upper clad and lower clad of the optical waveguide, respectively, and "k" represents a wavenumber. As described later, in the optical scanning element, the cavity 80 functions as the lower clad, and an external environment (air portion) above the element functions as the upper clad, and hence $n_a$ and $n_s$ may each represent 1.

Emission angles $\theta_a$ and $\theta_s$ with respect to a reference surface may each be determined from the following equation (2). A surface including the waveguide direction of the optical waveguide 16 as a normal is set to the reference surface (the reference surface also includes the normal of the photonic crystal layer 10).

$$n_a \cdot k \cdot \sin \theta_a = n_s \cdot k \cdot \sin \theta_s = \beta_q \quad (2)$$

Further, the equation (1) may be represented as the following equation (3). Herein, the condition under which the equation (3) is actually valid is a case in which q≤−1. Accordingly, first-order diffracted light may be emitted to the outside of the optical waveguide at the emission angles $\theta_a$ and $\theta_s$ calculated when q=−1.

$$n_{wg} \cdot \frac{2\pi}{\lambda} + \frac{2\pi}{\Lambda} q = n_a \cdot \frac{2\pi}{\lambda} \cdot \sin \theta a \quad (3)$$
$$= n_s \cdot \frac{2\pi}{\lambda} \cdot \sin \theta s$$

q:diffraction order

As is apparent from the equation (3), the emission angles $\theta_a$ and $\theta_s$ may change with $n_{wg}$ and the wavelength Λ of the entering light. Herein, the $n_{wg}$ corresponds to the equivalent refractive index of light propagating in an optical waveguide (line-defect optical waveguide) formed by removing the holes corresponding to one row in the photonic crystal. According to the embodiment of the present invention, when the photonic crystal (photonic crystal layer) is formed in the electro-optical crystal substrate, the equivalent refractive index becomes extremely large at longer wavelengths of a photonic band, and the equivalent refractive index is largely changed by applying a voltage. As a result, the change of (an electric field to be formed by) the applied voltage can largely change the $n_{wg}$ in the equation (3), and hence can largely change the emission angle $\theta_a$. In other words, the change of the applied voltage can change the emission angle $\theta_a$ in a wide range and to a desired angle. Further, the photonic crystal based on the electro-optical crystal substrate has the following advantage over a photonic crystal based on a semiconductor (e.g., monocrystalline silicon). The photonic crystal formed from the semiconductor has a small electro-optical effect, and hence its refractive index is hardly changed even when a voltage is applied thereto. Accordingly, when an attempt is made to change an emission angle in an optical scanning element utilizing such photonic crystal, there is a need to change the wavelength of entering light or to heat the element to change its refractive index. As a result, when the wavelength is changed, a plurality of light sources having different wavelengths are, or a multiple wavelength light source is, required. Thus, cost for the element increases, and a constraint on the design thereof becomes larger. Further, it is difficult to continuously change the wavelength of a light source, and hence it is also difficult to continuously change the emission angle. In addition, some wavelengths of the light source may preclude the achievement of a desired emission angle. In addition, when the heating is performed, it is difficult to uniformize the temperature distribution of the photonic crystal portion and to make the element quickly responsive. In addition, temperature control when an environmental temperature changes requires an external circuit including a sensor, and hence an increase in cost becomes a problem. Further, a change in equivalent refractive index with a temperature change is relatively small, and a change in emission angle of more than 50° has not been reported at present. In contrast, according to the embodiment of the present invention, a voltage to be applied between the electrodes only needs to be changed, and the voltage can be continuously changed. Accordingly, there can be achieved an optical scanning element, which is available at low cost, can be designed with a small constraint, and can change an emission angle in a wide range and to a desired angle.

Figure 5:
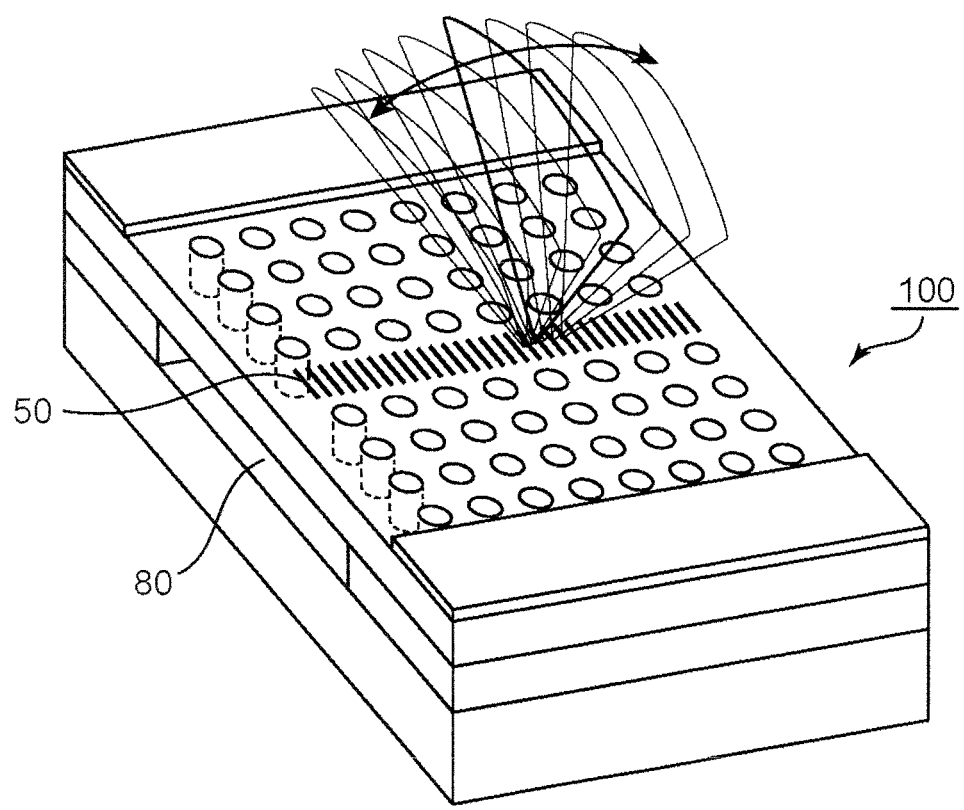
FIG. 5 is a schematic perspective view for illustrating the manner in which emitted light beams emitted from the optical scanning element according to the embodiment of the present invention spread.

FIG. 5 is a schematic perspective view for illustrating the manner in which emitted light beams emitted from the optical scanning element spread. As illustrated in FIG. 5, the emitted light beams (laser light) emitted from the optical scanning element (substantially, the optical waveguide) via the above-mentioned mechanism become so-called fan beams that are line shapes in plan view (line shapes in a direction perpendicular to an optical waveguide direction) and are a fan shape when viewed from the optical waveguide direction. The angle of the fan (the spread angle of the fan beams) is preferably 10° or more, more preferably 25° or more, still more preferably 50° or more. The spread angle of the fan beams may be, for example, 120° or less. The spread angle of the fan beams may be controlled by adjusting the width of the optical waveguide. In other words, as in a relationship between a near field and a far field, the narrowing of the width of the optical waveguide enlarges the spread, and hence can enlarge the spread angle. In addition, in contrast, the widening of the width of the optical waveguide can narrow the spread angle. When the spread angle falls within such ranges, an optical scanning element having extremely excellent scanning efficiency can be achieved by a synergistic effect with the following effect: the emission angle can be changed in a wide range. In particular, an optical scanning element for LiDAR has been required to have an angle of view of 100° or more in a horizontal direction and an angle of view of 25° or more in a vertical direction. To satisfy the requirement, the spread angle of the fan beams (in the vertical direction) may be set as described above. In addition, the emission angle can be preferably changed in the range of ±400 or more, and can be more preferably changed in the range of ±60° or more. The emission angle may be, for example, ±70° or less. As described above, according to the embodiment of the present invention, the emission angle can be changed in a range much wider than that of a related-art optical scanning element. In this description, the sign "+" of the emission angle means an output side with respect to the above-mentioned reference surface, and the sign "−" thereof means an input side with respect to the reference surface.

Figure 6:
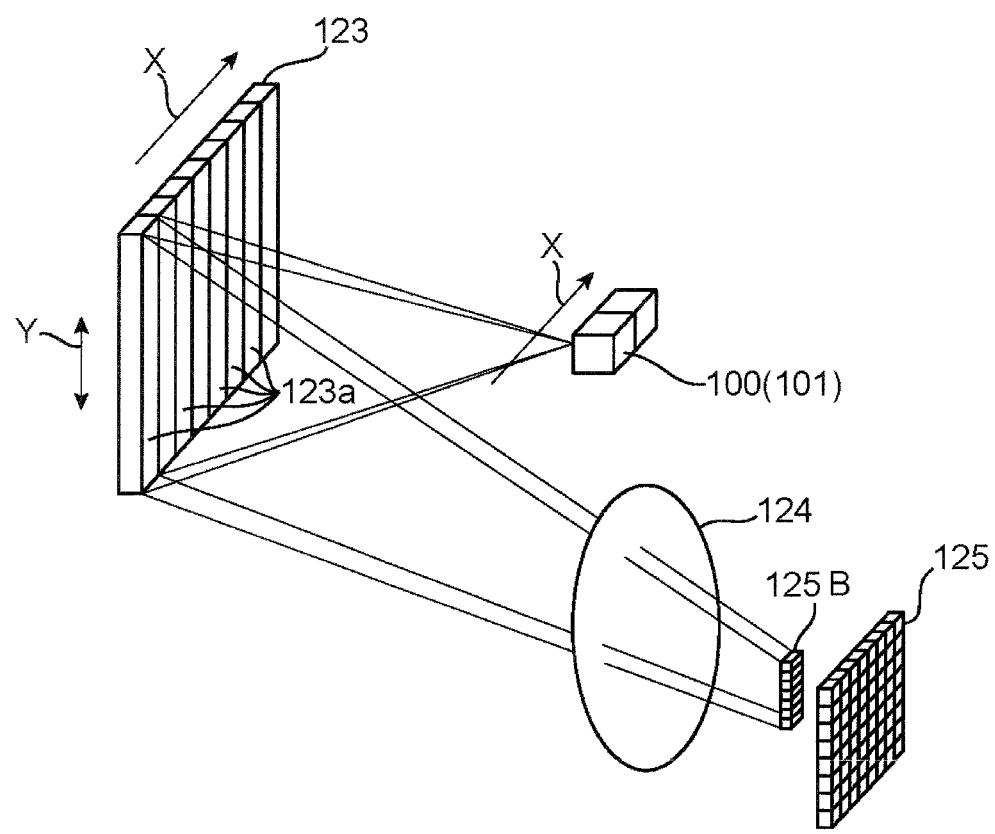
FIG. 6 is a conceptual view for illustrating a method of scanning an object surface with the optical scanning element according to the embodiment of the present invention.

Next, an example of a method of using the optical scanning element is described. FIG. 6 is a conceptual view for illustrating a method of scanning an object surface with the optical scanning element. As described above, when a voltage to be applied to the optical scanning element according to the embodiment of the present invention is changed, light (fan beams) spreading in the direction perpendicular to the optical waveguide direction can be extracted at an extremely wide range of emission angles with respect to the surface (reference surface) that includes a normal with respect to the optical scanning element and is perpendicular to the optical waveguide direction. Accordingly, when the optical waveguide direction of the optical scanning element 100 or 101 is caused to coincide with a horizontal direction X, fan beams spreading in a vertical direction Y can be extracted. In a surface to be measured (object surface) 123, when the fan beams are projected onto the foremost row out of the rows 123a of the object surface in the illustrated example, reflected light from the row can be condensed with a lens 124 and received with the light-receiving element array 125B of light-receiving elements 125. Next, according to the optical scanning element according to the embodiment of the present invention, a change in voltage to be applied thereto can largely change the emission angle of each of the fan beams along the horizontal direction X. As a result, when the emission angle is changed at a predetermined angle, the fan beams can be projected onto the next row (row next to the row onto which the fan beams have been projected). Accordingly, the entirety of the object surface 123 can be scanned without movement of the optical scanning element along the horizontal direction X. As a result, time and cost for the scanning can be significantly reduced as compared to the conventional ones, and cost for the light-receiving element array can be significantly reduced as compared to the conventional one. The light-receiving elements may be, for example, two-dimensionally arrayed photodiodes, CMOS cameras, or CCDs.

B. Photonic Crystal Layer

B-1. Electro-Optical Crystal Substrate

Figure 8:
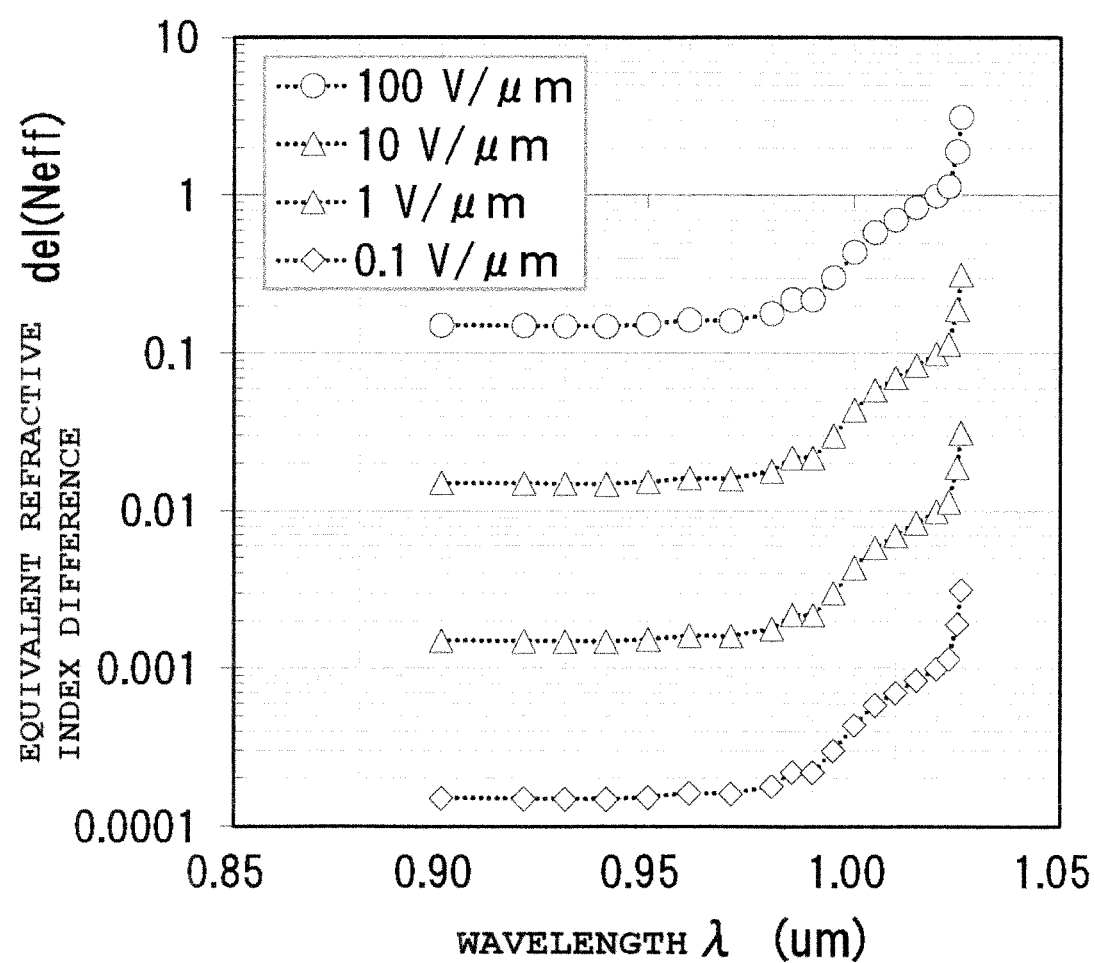
FIG. 8 is a graph for showing the wavelength dependence of an equivalent refractive index difference.

The electro-optical crystal substrate 10 includes an upper surface exposed to the outside and a lower surface positioned in a composite substrate. The electro-optical crystal substrate 10 includes the crystal of a material having an electro-optical effect. Specifically, the application of a voltage (electric field) to the electro-optical crystal substrate 10 may change its refractive index. Accordingly, the following advantage can be obtained as compared to a case in which a semiconductor material (e.g., monocrystalline silicon) is used in an optical scanning element. In the optical scanning element using the semiconductor material, the enlarging effect of a photonic crystal on the wavelength dependence of an equivalent refractive index is utilized. Alternatively, the enlarging effect thereof on the temperature dependence of the equivalent refractive index is utilized. In the former case, however, the wavelength dependence is enlarged by the photonic crystal, and hence fan beams are emitted at angles varying from wavelength to wavelength. Accordingly, the following problems may occur: light sources having a plurality of wavelengths are required; and signal processing is performed by independently recognizing the plurality of wavelengths on a light-receiving side, and hence the processing becomes complicated. In the latter case, some degree of time is required for heating and cooling the photonic crystal portion to set its temperature to a desired value and to uniformize its in-plane distribution, and hence it is difficult to increase the response speed of the element. In addition, temperature control when an environmental temperature changes requires an external circuit including a sensor, and hence an increase in cost becomes a problem. Further, a change in equivalent refractive index with a temperature change is relatively small. In contrast, when the electro-optical crystal substrate is used, as described above, the application of a voltage (electric field) thereto can change an equivalent refractive index. A difference in equivalent refractive index of light propagating in an optical waveguide arranged in the photonic crystal is shown in FIG. 8. In FIG. 8, calculation results when lithium niobate is used as the electro-optical crystal substrate, and its hole period and hole radius are set to 425 nm and 144.5 nm, respectively, are shown. As shown in FIG. 8, the equivalent refractive index difference becomes larger at longer wavelengths in a photonic band. Herein, the term "longer wavelengths" means wavelengths longer than the central wavelength of the photonic band, or wavelengths longer than the wavelength of a photonic band confinement mode. In addition, in the region, the wavelength dependence of the equivalent refractive index difference also becomes larger. When a voltage is applied to the electro-optical crystal substrate, the equivalent refractive index difference may also become larger together with a change in refractive index thereof by its electro-optical effect. An equivalent refractive index difference $\Delta N_{\it eff}$ in FIG. 8 is represented by the following equation where $N_{\it eff}(0)$ represents an equivalent refractive index when no voltage is applied, and $N_{\it eff}(V)$ represents an equivalent refractive index when a voltage is applied.

$$\Delta N_{\it eff} = N_{\it eff}(V) - N_{\it eff} \qquad (0)$$

Figure 9:
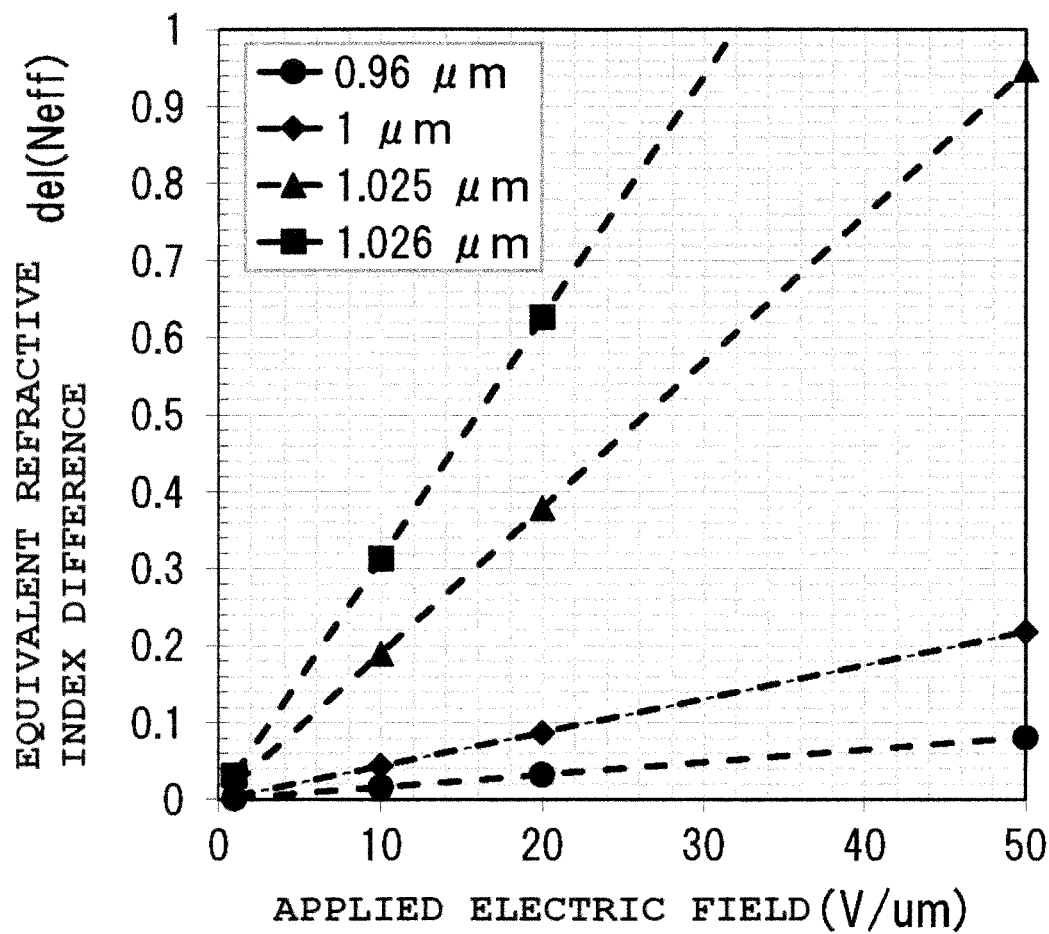
FIG. 9 is a graph for showing relationships between the equivalent refractive index difference and an applied voltage (electric field) at different wavelengths.

FIG. 9 is a graph for showing relationships between an applied electric field and the equivalent refractive index difference at specific wavelengths, the graph being obtained from the calculation results of FIG. 8. As shown in FIG. 9, in a region where a wavelength $\Lambda$ is short, a change in equivalent refractive index difference with the electric field is extremely small as in an optical waveguide diffraction device in which no photonic crystal is formed. Meanwhile, in a photonic band end region where the wavelength $\Lambda$ is long, the change in equivalent refractive index difference with the electric field may be large. Thus, the photonic crystal utilizing the electro-optical crystal substrate can enlarge the equivalent refractive index difference (largely change the equivalent refractive index) through voltage application, and hence can largely change the emission angle of diffracted light in correspondence with the change.

In one embodiment, a c-axis of the electro-optical crystal substrate 10 may be parallel to the electro-optical crystal substrate 10. That is, the electro-optical crystal substrate 10 may be an X-cut substrate or a Y-cut substrate. In another embodiment, the c-axis of the electro-optical crystal substrate 10 may be perpendicular to the electro-optical crystal substrate 10. That is, the electro-optical crystal substrate 10 may be a Z-cut substrate. The thickness of the electro-optical crystal substrate 10 may be set to any appropriate thickness depending on the frequency and wavelength of an electromagnetic wave to be used. The thickness of the electro-optical crystal substrate 10 may be, for example, from 0.1 μm to 10 μm, or for example, from 0.1 μm to 3 μm. Typically, as described above, in the optical scanning element, the electro-optical crystal substrate is integrated with the support substrate, and is hence reinforced by the support substrate. Accordingly, the thickness of the electro-optical crystal substrate can be reduced. As a result, light having a wavelength suitable for the optical scanning element can be propagated in the optical waveguide in a single mode, and/or the efficiency with which the light is coupled with the diffraction grating can be easily improved.

Any appropriate material may be used as a material for forming the electro-optical crystal substrate 10 as long as the effects achieved in the embodiment of the present invention can be obtained. As such material, there is typically given a dielectric material (for example, a ceramic). Specific examples thereof include lithium niobate ($LiNbO_3$:LN), lithium tantalate ($LiTaO_3$:LT), potassium titanate phosphate ($KTiOPO_4$:KTP), potassium lithium niobate ($K_xLi_{(1-x)}NbO_2$:KLM), potassium niobate ($KNbO_3$:KN), potassium tantalate niobate ($KNb_xTa_{(1-x)}O_3$:KTN), and a solid solution of lithium niobate and lithium tantalate. When lithium niobate or lithium tantalate is used, lithium niobate or lithium tantalate doped with MgO, or the crystal thereof having stoichiometric composition may be used for suppressing optical damage.

B-2. Photonic Crystal Layer

As described above, the photonic crystal layer 10 is obtained by periodically forming the holes 12 in the electro-optical crystal substrate. A photonic crystal for forming the photonic crystal layer is a multidimensional periodic structural body formed by arranging a medium having a large refractive index and a medium having a small refractive index at a period comparable to the wavelength of light, and has the band structure of light similar to the band structure of an electron. Accordingly, appropriate design of the periodic structure can express a forbidden band (photonic band gap) for predetermined light. A photonic crystal having a forbidden band functions as an object that neither reflects nor transmits light having a predetermined wavelength. The introduction of a line defect that disturbs periodicity into the photonic crystal having a photonic band gap results in the formation of a waveguide mode in the frequency region of the band gap, and hence can achieve an optical waveguide that propagates light with a low loss.

The photonic crystal of the illustrated example is a so-called slab two-dimensional photonic crystal. The slab two-dimensional photonic crystal refers to a photonic crystal obtained by: arranging, on a thin-plate slab made of a dielectric material (in the embodiment of the present invention, the electro-optical crystal), circular columnar or polygonal columnar low-refractive index pillars each having a refractive index lower than the refractive index of the material for forming the thin-plate slab at appropriate two-dimensional periodic intervals in accordance with purposes and a desired photonic band gap; and sandwiching the upper and lower portions of the thin-plate slab between an upper clad and a lower clad each having a refractive index lower than that of the thin-plate slab. In the illustrated example, the holes 12 function as the low-refractive index pillars, a portion 14 between the holes 12 and 12 of the electro-optical crystal substrate 10 functions as a high-refractive index portion, the cavity 80 functions as the lower clad, and an external environment (air portion) above the optical scanning element 100 functions as the upper clad. A portion in the electro-optical crystal substrate 10 where the periodic pattern of the holes 12 is not formed serves as a line defect, and the line defect portion forms an optical waveguide 16.

As described above, the holes 12 may be formed as a periodic pattern. The holes 12 are typically arrayed so as to form regular lattices. Any appropriate form may be adopted as the form of each of the lattices as long as a predetermined photonic band gap can be achieved. Typical examples thereof include a triangular lattice and a square lattice. In one embodiment, the holes 12 may be through-holes. The through-holes are easy to form, and as a result, their refractive indices are easy to adjust. Any appropriate shape may be adopted as the plan-view shape of each of the holes (through-holes). Specific examples thereof include equilateral polygons (e.g., an equilateral triangle, a square, an equilateral pentagon, an equilateral hexagon, and an equilateral octagon), a substantially circular shape, and an elliptical shape. Of those, a substantially circular shape is preferred. The ratio of the long diameter of the substantially circular shape to the short diameter thereof is preferably from 0.90 to 1.10, more preferably from 0.95 to 1.05. As described above, the through-holes 12 may be low-refractive index pillars (pillar-shaped portions each including a low-refractive index material). However, the through-holes are easier to form, and the through-holes each include air having the lowest refractive index. Accordingly, a difference in refractive index between each of the through-holes and the optical waveguide can be made larger. In addition, part of hole diameters may be different from the other hole diameters, and part of hole periods may also be different from the other hole periods. In addition, a relationship between the hole period P and the radius d/2 of each of the holes is as follows: the ratio "d/(2 P)" is preferably 0.2 or more and 0.48 or less, more preferably 0.25 or more and 0.4 or less, still more preferably 0.3 or more and 0.34 or less. When the ratio falls within such ranges, an equivalent refractive index difference caused by voltage application can be enlarged.

The lattice pattern of the holes may be appropriately set in accordance with purposes and a desired photonic band gap. In the illustrated example, the holes each having a diameter "d" form square lattices at a period P. Although the square lattices are formed in the illustrated example, when the diameters, period, and the like of the holes are appropriately set, even triangular lattices may provide the same operation, function, and effect. The square lattice patterns are formed on both the sides of the photonic crystal element, and the optical waveguide 16 is formed in the central portion thereof where no lattice pattern is formed. The length of the optical waveguide 16 is preferably 5 mm or less, more preferably from 0.1 mm to 3 mm. According to the embodiment of the present invention, the combination of the photonic crystal layer including the electro-optical crystal and a predetermined diffraction grating can extremely shorten the length of the optical waveguide. As a result, the optical scanning element can be downsized. The width of the optical waveguide 16 may be, for example, from 1.01 P to 3 P (2 P in the illustrated example) with respect to the hole period P. The number of the rows of the holes (hereinafter sometimes referred to as "lattice rows") in the optical waveguide direction may be from 3 to 10 (4 in the illustrated example) on each side of the optical waveguide. The hole period P may satisfy, for example, the following relationship:

$$(1/7) \times (\lambda/n) \leq P \leq 1.4 \times (\lambda/n)$$

where $\lambda$ represents the wavelength (nm) of light to be introduced into the optical waveguide, and "n" represents the refractive index of the electro-optical crystal substrate. The hole period P may be specifically from 0.1 μm to 1 μm. In one embodiment, the hole period P may be identical to the thickness of the photonic crystal layer (electro-optical crystal substrate). The diameter "d" of each of the holes may be, for example, from 0.1 P to 0.9 P with respect to the hole period P. When the diameter "d" of each of the holes, the hole period P, the number of the lattice rows, the number of the holes in one lattice row, the thickness of the photonic crystal layer, the constituent material (substantially, refractive index) of the electro-optical crystal substrate, the width of the line defect portion, the width and height of the cavity to be described later, and the like are adjusted by being appropriately combined with each other, the desired photonic band gap can be obtained. Further, the same effect can be obtained for an electromagnetic wave except a light wave. Specific examples of the electromagnetic wave include a millimeter wave, a microwave, and a terahertz wave.

In one embodiment, a through-hole for etching (not shown) may be formed in the photonic crystal layer (electro-optical crystal substrate) 10. The formation of the through-hole for etching enables an etchant to satisfactorily pervade the entirety of a region to be etched. As a result, a desired cavity can be more precisely formed. The number of the through-holes for etching may be appropriately set in accordance with purposes. Specifically, a single through-hole for etching may be formed, or a plurality of (e.g., two, three, or four) through-holes for etching may be formed. The through-hole for etching is formed at, for example, a position distant from the optical waveguide by 3 or more lattice rows. Such configuration enables the etchant to satisfactorily pervade the entirety of the region to be etched without adversely affecting the photonic band gap of the photonic crystal. The through-hole for etching may also be formed on, for example, the input portion side and/or output portion side (i.e., a corner portion of the photonic crystal layer) of the end portion of the lattice pattern opposite to the optical waveguide. Such configuration can more satisfactorily prevent adverse effects on the photonic band gap. For example, when four through-holes for etching are formed, the through-holes may be formed at the four corners of the photonic crystal layer. The size of the through-hole for etching is typically larger than the size of each of the holes 12. For example, the diameter of the through-hole for etching is preferably 5 or more times, more preferably 50 or more times, still more preferably 100 or more times as large as the diameter "d" of each of the holes. Meanwhile, the diameter of the through-hole for etching is preferably 1,000 or less times as large as the diameter "d" of each of the holes. When the diameter of the through-hole for etching is excessively small, the etchant may not satisfactorily pervade the entirety of the region to be etched. When the diameter of the through-hole for etching is excessively large, the size of the element needs to be made larger than a desired size in some cases. In addition, the mechanical strength thereof may reduce.

C. Joining Portion

The joining portion 20 is interposed between the electro-optical crystal substrate 10 and the support substrate 30 to integrate the substrates with each other. Typically, as illustrated in each of FIG. 2 and FIG. 3, the upper layer 21 and lower layer 22 of the joining portion 20 are directly joined to each other to integrate the electro-optical crystal substrate 10 and the support substrate 30 with each other. When the electro-optical crystal substrate 10 and the support substrate 30 are integrated with each other through the direct joining, peeling in the optical scanning element can be satisfactorily suppressed, and as a result, damage to the electro-optical crystal substrate (e.g., a crack) resulting from such peeling can be satisfactorily suppressed. The joining portion 20 is formed as an etching residual portion at the time of the formation of the holes 12 and the cavity 80. An amorphous layer 23 is typically formed at a joining interface between the upper layer 21 and the lower layer 22. The amorphous layer 23 is a layer formed at the joining interface through the direct joining of the upper layer 21 and the lower layer 22. As its name suggests, the amorphous layer has an amorphous structure, and includes an element for forming the upper layer 21 and an element for forming the lower layer 22. When the upper layer 21 and the lower layer 22 are directly joined to each other as described above, the amorphous layer 23 may be formed at the joining interface between the upper layer 21 and the lower layer 22. That is, when the upper layer 21 and the lower layer 22 are directly joined to each other, direct joining of the electro-optical crystal substrate and the support substrate can be avoided, and hence the formation of the amorphous layer on the electro-optical crystal substrate can be prevented. As a result, reductions in optical characteristics of the electro-optical crystal substrate or the optical loss thereof can be suppressed.

The term "direct joining" as used herein means that two layers or substrates (in the illustrated example, the upper layer 21 and the lower layer 22) are joined to each other without via any adhesive. The form of the direct joining may be appropriately set depending on the configuration of the layers or substrates to be joined to each other. For example, the direct joining may be achieved by the following procedure. In a high vacuum chamber (e.g., about $1 \times 10^{-6}$ Pa), a neutralized beam is applied to each joining surface of constituents (layers or substrates) to be joined. As a result, each joining surface is activated. Then, in a vacuum atmosphere, the activated joining surfaces are brought into contact with each other and joined to each other at normal temperature. A load at the time of the joining may be, for example, from 100N to 20,000N. In one embodiment, when the surface activation is performed with a neutralized beam, an inert gas is introduced into a chamber, and a high voltage is applied from a DC power source to electrodes arranged in the chamber. With such configuration, electrons move owing to an electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. An atomic species for forming the beam is preferably an inert gas element (e.g., argon (Ar) or nitrogen (N)). A voltage at the time of activation by beam irradiation is, for example, from 0.5 kV to 2.0 kV, and an electric current is, for example, from 50 mA to 200 mA. A method for the direct joining is not limited thereto, and a surface activation method including using a fast atom beam (FAB) or an ion gun, an atomic diffusion method, a plasma joining method, or the like may also be applied.

Any appropriate configuration may be adopted for each of the upper layer 21 and the lower layer 22 in accordance with purposes, the desired configuration of the photonic crystal layer, and a method of producing the optical scanning element (substantially, an etching process). Specifically, each of the upper layer 21 and the lower layer 22 may be a single layer, or may have a laminated structure. Constituent materials for the upper layer and the lower layer (when at least one of the upper layer or the lower layer has a laminated structure, constituent materials for the respective layers) may also be appropriately selected in accordance with purposes, the desired configuration of the photonic crystal layer, and the etching process.

D. Cavity

As described above, the cavity 80 is formed by removing the upper layer 21 and the lower layer 22 (and necessarily, the amorphous layer) through etching, and can function as a lower clad. The width of the cavity is preferably larger than the width of the optical waveguide. For example, the cavity 80 may extend up to the third lattice row from the optical waveguide 16. In the illustrated example, the cavity 80 extends up to the third lattice row from the optical waveguide 16. Light propagates in the optical waveguide, and moreover, part of light energy may diffuse up to the lattice row near the optical waveguide. Accordingly, the arrangement of the cavity directly below such lattice row can suppress a propagation loss due to light leakage. From this viewpoint, the cavity may be formed over the entire region of a hole-formed portion. The height of the cavity is preferably 0.1 µm or more, and is more preferably ⅕ or more of the wavelength of the light propagating in the optical waveguide. Such height causes a thin-plate slab to function as a photonic crystal, and hence can achieve an optical waveguide having higher wavelength selectivity and a lower loss. The height of the cavity may be controlled by adjusting the thicknesses of the upper layer 21 and the lower layer 22.

E. Support Substrate

The support substrate 30 includes an upper surface positioned in the composite substrate and a lower surface exposed to the outside. The support substrate 30 is arranged for improving the strength of the composite substrate. Thus, the thickness of the electro-optical crystal substrate can be reduced. Any appropriate configuration may be adopted as the support substrate 30. Specific examples of a material for forming the support substrate 30 include silicon (Si), glass, SiAlON ($Si_3N_4$—$Al_2O_3$), mullite ($3Al_2O_3 \cdot 2SiO_2$, $2Al_2O_3 \cdot 3SiO_2$), aluminum nitride (AlN), silicon nitride ($Si_3N_4$), magnesium oxide (MgO), sapphire, quartz, crystal, gallium nitride (GaN), silicon carbide (SiC), and gallium oxide ($Ga_2O_3$). The coefficient of linear expansion of the material for forming the support substrate 30 is preferably as close as possible to the coefficient of linear expansion of the material for forming the electro-optical crystal substrate 10. Such configuration can suppress the thermal deformation (typically, warping) of the composite substrate. The coefficient of linear expansion of the material for forming the support substrate 30 preferably falls within the range of from 50% to 150% with respect to the coefficient of linear expansion of the material for forming the electro-optical crystal substrate 10. From this viewpoint, the support substrate may include the same material as that of the electro-optical crystal substrate 10.

F. Diffraction Grating

As described above, the diffraction grating 50 of the illustrated example is a grating pattern in the direction perpendicular to the direction of the waveguide in plan view, and in a section along the direction of the waveguide, the protruding portion having a width of $\Lambda/2$ and the slit having a width of $\Lambda/2$ are alternately formed. The periods of the protruding portions and the slits are each preferably from 40 nm to 1,000 nm, more preferably from 100 nm to 800 nm, still more preferably from 150 nm to 650 nm. When each of the periods of the protruding portions and the slits (accordingly, a width 2 times as large as the width of each of the protruding portion and the slit) falls within such ranges, a desired emission angle can be easily achieved. The width of each of the protruding portion and the slit may not be ½ of the period. The thickness of the protruding portion or the depth of the slit may be, for example, from 10 nm to 300 nm. When the thickness or the depth falls within such range, the following advantage is obtained: light propagating in the optical waveguide is periodically reflected by an effective refractive index difference resulting from the unevenness of the diffraction grating, and hence a diffraction effect can be expressed.

The diffraction grating (substantially, the protruding portions) may include any appropriate material as long as desired emitted light is obtained. The material for forming the diffraction grating is typically, for example, a metal oxide. Specific examples thereof include tantalum oxide, silicon oxide, aluminum oxide, titanium oxide, niobium oxide, magnesium oxide, tungsten oxide, and hafnium oxide. In addition, the diffraction grating may be directly formed on the electro-optical crystal substrate.

G. Clad Layer

The clad layer 60 is an optional layer to be arranged for the purpose of suppressing the absorption of guided light by the electrodes and/or improving the coupling of the guided light with the diffraction grating. The clad layer may include any appropriate material. Specific examples thereof include silicon oxide, tantalum oxide, aluminum oxide, titanium oxide, niobium oxide, magnesium oxide, tungsten oxide, and hafnium oxide. The clad layer may be formed from the same material as that of the diffraction grating. The thickness of the clad layer may be, for example, from 0.1 µm to 1 µm.

H. Electrodes

The electrodes may not overlap the plurality of holes 12, or may overlap the plurality of holes 12 when viewed from the thickness direction (vertical direction) of the photonic crystal layer 10.

As illustrated in FIG. 1, in one embodiment, the electrodes 40 and 40 are arranged in the left-side end portion and right-side end portion of the photonic crystal layer (electro-optical crystal substrate) 10 so as not to overlap the plurality of holes 12 in the thickness direction of the photonic crystal layer 10. The electrodes 40 are positioned distant from the diffraction grating 50 in a direction perpendicular to the waveguide direction of the waveguide (horizontal direction). The plurality of holes 12 are positioned between each of the electrodes 40 and the diffraction grating 50.

The electrodes 40 may each include any appropriate material. The material for forming each of the electrodes 40 is, for example, a metal. That is, the electrodes 40 may be metal electrodes. Specific examples of the metal include titanium (Ti), platinum (Pt), and gold (Au). Each of the electrodes 40 may be a single layer or a laminate of two or more layers. The thicknesses of the electrodes 40 are typically 100 nm or more and 1,000 nm or less.

An interval between the electrodes 40 and 40 in the direction perpendicular to the waveguide direction of the waveguide is typically 5 µm or more and 20 µm or less.

The electrodes 40 may be formed so as to be transparent to light as in the electrodes 41 to be described later.

In addition, as illustrated in FIG. 11, in one embodiment, the electrodes 41 and 41 are arranged on both the sides of the optical waveguide 16 so that the electrodes each overlap at least one of the plurality of holes 12 in the thickness direction of the photonic crystal layer 10. In the embodiment of the illustrated example, the holes 12 are not positioned between each of the electrodes 41 and the optical waveguide 16. In this case, the electrode 41 positioned on the right side of the optical waveguide 16 overlaps all the holes 12 positioned on the right side of the optical waveguide 16 in the thickness direction of the photonic crystal layer 10. The electrode 41 positioned on the left side of the optical waveguide 16 overlaps all the holes 12 positioned on the left side of the optical waveguide 16 in the thickness direction of the photonic crystal layer 10. In one embodiment, the electrodes 41 have openings 41a communicating to the holes 12.

The electrodes 41 are typically transparent to light. More specifically, the transmittance of light having a wavelength of 1.025 µm in each of the electrodes 41 is, for example, 70% or more, preferably 90% or more, and is, for example, 100% or less. That is, the electrodes 41 may be transparent electrodes. When the electrodes are transparent to light, light emitted from the upper surface of the optical waveguide can be suppressed from being absorbed by the electrodes. Accordingly, as compared to a case in which the electrodes are opaque to light, the electrodes can be arranged near the optical waveguide, and hence an interval between the two electrodes can be reduced.

An interval between the transparent electrodes 41 and 41 in the direction perpendicular to the waveguide direction of the waveguide is smaller than the interval between the metal electrodes 40 and 40, and is typically 6 µm or less, preferably less than 5 µm, more preferably 3 µm or less, and is typically 1 µm or more. When the electrodes are arranged near the optical waveguide to reduce the interval between the two electrodes as described above, an electric field can be efficiently generated in the optical waveguide at the time of the application of a voltage between the electrodes. In particular, when the number of the holes positioned between each of the electrodes and the optical waveguide is reduced, a phenomenon in which the electric field concentrates on a portion between a hole of the electro-optical crystal substrate and another hole thereof, and hence the electric field in the optical waveguide reduces can be suppressed. Accordingly, a reduction in driving voltage of the optical scanning element required for the emission of desired fan beams can be achieved.

The transparent electrodes 41 may each include any appropriate material. Examples of the material for forming the transparent electrodes 41 include aluminum-doped zinc oxide (AZO), silicon oxide, indium tin oxide (ITO), Ga-doped zinc oxide (GZO), an In—Ga—Zn—O oxide semiconductor (IGZO), and tin oxide.

Each of the transparent electrodes 41 may be a single layer or a laminate of two or more layers. The thicknesses of the transparent electrodes 41 are typically 50 nm or more and 300 nm or less.

I. Method of Producing Optical Scanning Element

An example of a method of producing the optical scanning element is simply described with reference to FIG. 7A to FIG. 7D. In the illustrated example, the upper layer 21 is an optical loss-suppressing layer, and the lower layer 22 is a cavity-processing layer. The optical loss-suppressing layer 21 may be arranged for suppressing the optical loss of the electro-optical crystal substrate by preventing the formation of the amorphous layer on the electro-optical crystal substrate at the time of the direct joining of the upper and lower layers. The cavity-processing layer 22 is arranged not only for forming a cavity in the optical scanning element but also for stopping etching (typically, dry etching) at an appropriate level.

Figure 7A:
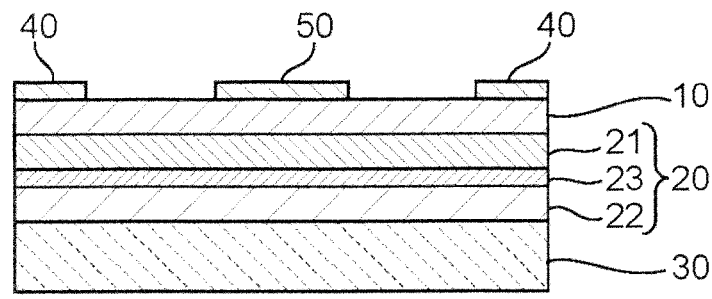
FIG. 7A, FIG. 7B, FIG. 7C, and FIG. 7D are each a schematic sectional view for illustrating an example of a method of producing the optical scanning element according to the embodiment of the present invention.

First, as illustrated in FIG. 7A, a composite substrate is produced. A production procedure for the composite substrate is as described below. The optical loss-suppressing layer 21 is formed on the electro-optical crystal substrate 10 by, for example, sputtering. Meanwhile, the cavity-processing layer 22 is formed on the support substrate 30 by, for example, sputtering. The laminate of the electro-optical crystal substrate 10 and the optical loss-suppressing layer 21, and the laminate of the support substrate 30 and the cavity-processing layer 22 are directly joined to each other by using the optical loss-suppressing layer 21 and the cavity-processing layer 22 as joining surfaces. The direct joining may form the amorphous layer 23 at the joining interface between the optical loss-suppressing layer 21 and the cavity-processing layer 22. Thus, the composite substrate in which the electro-optical crystal substrate 10 and the support substrate 30 are integrated with each other may be obtained. Next, the electrodes 40 and 40 are formed in the left and right end portions of the electro-optical crystal substrate 10, and the diffraction grating 50 is formed at the position at which the optical waveguide is to be formed. The electrodes 40 and 40 may be typically formed by a lift-off. The diffraction grating 50 may be formed by dry etching (e.g., reactive ion etching) through a mask having a predetermined pattern (typically, a stripe pattern extending in the direction substantially perpendicular to the waveguide direction of the optical waveguide). The electrodes 40 and 40 may be formed before the formation of the diffraction grating 50, or may be formed after the formation of the diffraction grating 50.

Figure 7B:
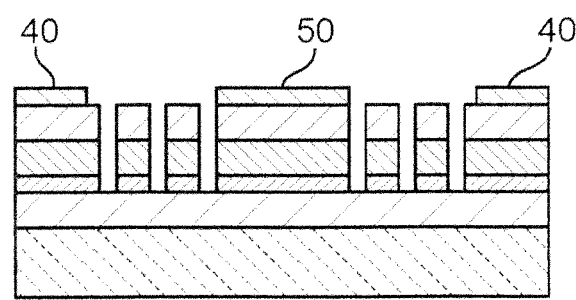
Figure 7C:
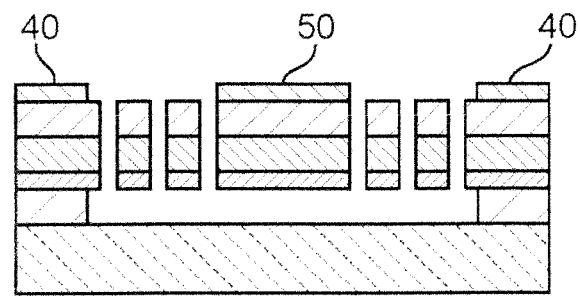
Figure 7D:
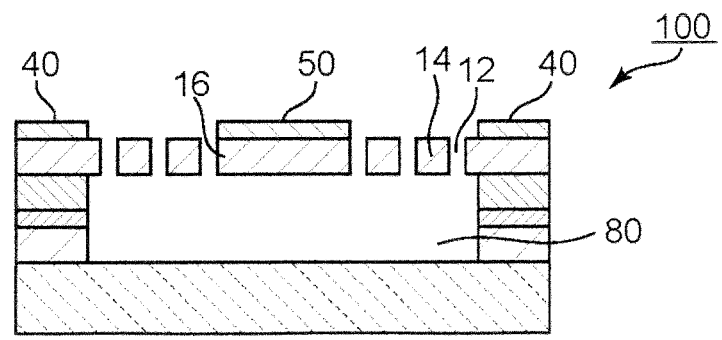

Next, as illustrated in FIG. 7B, the holes 12 are formed in the electro-optical crystal substrate 10, the optical loss-suppressing layer 21, and the amorphous layer 23 by dry etching (e.g., reactive ion etching) through a predetermined mask. Next, as illustrated in FIG. 7C, the predetermined portion of the cavity-processing layer 22 is removed by wet etching (e.g., immersion in an etchant). Finally, as illustrated in FIG. 7D, the remaining optical loss-suppressing layer 21 and amorphous layer 23 are removed by wet etching (e.g., immersion in an etchant). As a result, the cavity 80 is formed, and hence the optical scanning element is obtained.

Needless to say, a process different from that of the illustrated example may be adopted for the production of the optical scanning element. For example, the electrodes 40 and 40, and the diffraction grating 50 may be formed after the formation of the holes 12 and the cavity 80. In addition, for example, the configurations of the upper layer 21 and the lower layer 22 may be different from each other. Typical modifications of the upper layer 21 and the lower layer 22 are as described below. (i) The optical loss-suppressing layer and the cavity-processing layer can be integrated into a single layer (optical loss-suppressing and cavity-processing layer) to aggregate both of an optical loss-suppressing function and a cavity-forming function. In this case, the optical loss-suppressing and cavity-processing layer, and the support substrate may be directly joined to each other. (ii) A joining layer may be arranged on the joining surface of the optical loss-suppressing layer and/or the cavity-processing layer. (iii) When the surface of the optical loss-suppressing layer and/or the cavity-processing layer, or the surface of the optical loss-suppressing and cavity-processing layer has unevenness, an overcoat layer may be arranged as a layer for flattening the uneven surface. (iv) A sacrificial layer may be arranged as a layer for forming a cavity, which is intended for effectively expressing the function of the photonic crystal, into a desired shape and simply. The sacrificial layer may be typically formed into a pattern and a shape corresponding to the cavity in the optical scanning element. (v) A peeling-preventing layer may be arranged between the electro-optical crystal substrate and a layer adjacent thereto (e.g., the optical loss-suppressing layer).

When the overall configuration of the composite substrate, the constituent materials of the respective layers of the composite substrate, the mask, an etching mode, and the like are appropriately combined with each other, the diffraction grating, the holes, and the cavity can be formed by an efficient procedure and with high accuracy, and hence the optical scanning element can be produced.

EXAMPLES

Now, the present invention is specifically described by way of Examples. However, the present invention is not limited to these Examples.

Example 1: Analysis of Relationship Between Equivalent Refractive Index and Emission Angle 1. Wavelength Dependence and Electric Field Dependence of Equivalent Refractive Index A photonic crystal layer equivalent to that of FIG. 1 was examined for the wavelength dependence and electric field dependence of the equivalent refractive index of light propagating in its optical waveguide. Herein, a lithium niobate crystal substrate was used as an electro-optical crystal substrate, and the thickness of the substrate was set to 0.4 µm. Further, the hole pattern of the layer was set to a triangular lattice pattern, and the hole period and hole diameter thereof were set to 425 nm and 289 nm, respectively. Through use of such conditions, a relationship between an equivalent refractive index difference and the wavelength of the light was calculated by a finite difference time domain (FDTD) method and by using the electric field intensity of the optical waveguide when a voltage was applied to the optical waveguide as a parameter. The results are shown in FIG. 8. As is apparent from FIG. 8, it is found that in the short-wavelength region of a photonic band, the wavelength dependence of the equivalent refractive index difference changes to such a small extent as to follow the typical wavelength dispersion of a refractive index. In addition, with regard to the electric field dependence of the equivalent refractive index difference, the numerical value thereof is increased by an amount roughly corresponding to an electro-optical effect (Pockels effect). Meanwhile, in the long-wavelength region of the photonic band, each of the wavelength dependence and the electric field dependence changes by a large amount. The equivalent refractive index difference $\Delta N_{e\!f\!f}$ in FIG. 8 is represented by the following equation where $N_{e\!f\!f}(0)$ represents an equivalent refractive index when no voltage is applied, and $N_{e\!f\!f}(V)$ represents an equivalent refractive index when a voltage is applied.

$$\Delta N_{e\!f\!f} = N_{e\!f\!f}(V) - N_{e\!f\!f} \tag{0}$$

The relationship of the equivalent refractive index difference with an applied electric field, which is obtained from the results of the above-mentioned section 1, is shown in FIG. 9. The wavelength was set to 0.96 µm, 1 µm, 1.025 µm, or 1.026 µm, and the electric field was set to 0.1 V/µm, 10 V/µm, 20 V/µm, or 50 V/µm. It is found from FIG. 9 that the equivalent refractive index difference linearly changes with the voltage (electric field). In addition, it was found that a voltage (electric field)-dependent equivalent refractive index difference became larger as the wavelength became closer to longer wavelengths of a photonic band end. It is found that in the case of a wavelength of 1.025 µm, the equivalent refractive index changes by 0.38 in an electric field of 20 V/µm. The upper limit of the applied voltage (electric field) may vary depending on a constituent material for the electro-optical crystal substrate. In the case of, for example, a lithium niobate crystal, its dielectric breakdown electric field is said to be 20 V/µm, and hence an optical scanning element including the crystal needs to be operated in an electric field equal to or less than the value. With regard to the phenomenon, the same change occurs even in an electric field of the opposite direction. Accordingly, the application of an electric field of ±20 V/µm changes the equivalent refractive index by up to 0.76.

2. Relationship Between Applied Voltage and Emission Angle

A relationship between an applied voltage and an emission angle (deflection angle) in the optical scanning element of FIG. 1 was calculated by using the equation (3). A specific procedure is as described below. When the propagation constant of light propagating in the optical waveguide of the element is represented by β, the left-hand side of the equation (3) can be represented by the equation (4). A diffraction order "q" in the equation (4) is set to −1.

$$\beta - 2\pi/\Lambda = \beta N \quad (4)$$

Meanwhile, when the refractive index $n_a$ of the upper clad of the optical waveguide is set to 1 on the assumption that air serves as the clad, the right-hand side thereof can be represented by the equation (5).

$$2\pi/\lambda \cdot \sin\theta_a = k_0 \cdot \sin\theta_a \quad (5)$$

When the hole period "d" is set to 425 nm, and the wavelength λ of the light is set to 1.025 µm, under a state in which no voltage is applied to the element, the propagation constant β is calculated to be 0.75×(2π/d) by FDTD calculation. Herein, a relationship between the hole period "d" and the wavelength λ is represented as d/λ=0.414, and hence a relationship represented by the equation (6) is obtained.

$$\beta = 1.81 k_0 \quad (6)$$

Figure 10:
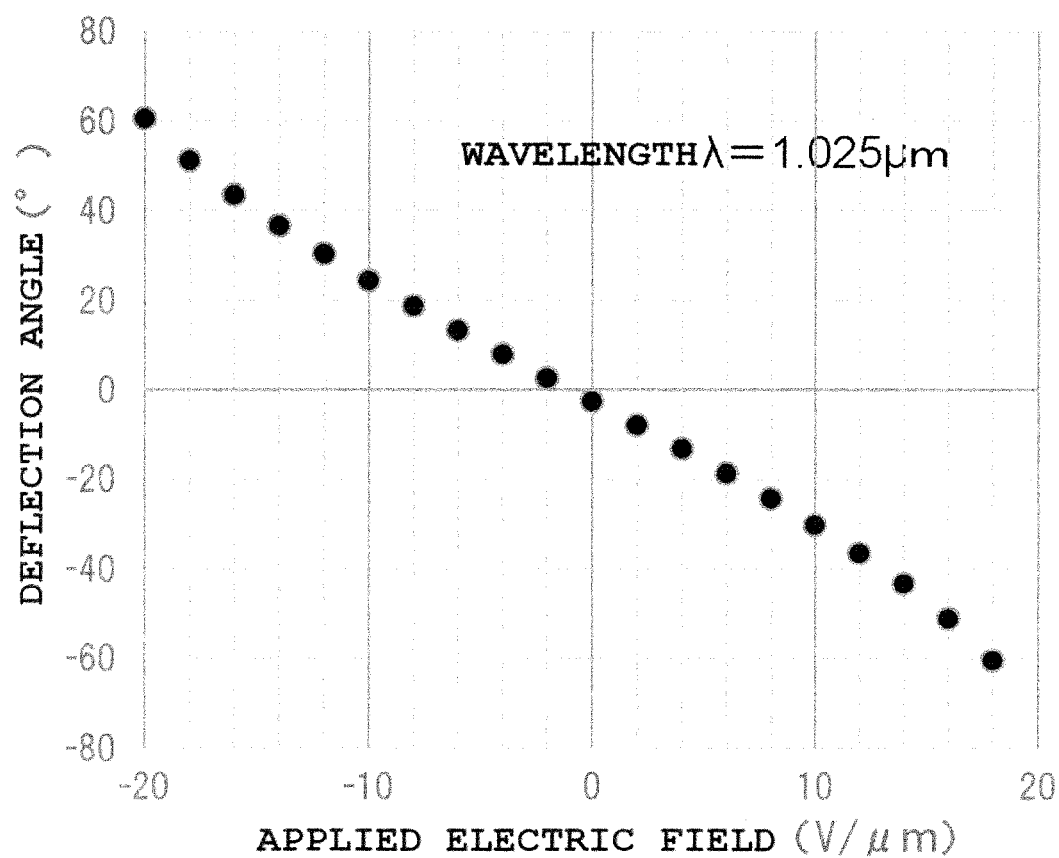
FIG. 10 is a graph for showing a relationship between the applied voltage and an emission angle.

In the case where a diffraction grating period Λ is 567 nm, when the result obtained in the equation (6) is substituted into the equation (4), 2π/Λ is equal to 1.81 $k_0$, and hence the equation (4) is rewritten as βN=0. As a result, the equations (4) and (5) provide $\theta_a$=0°. Next, when a voltage is applied thereto, and the intensity of an electric field generated by the voltage is set to −20 V/µm, the equivalent refractive index of the light changes by −0.38, and hence the propagation constant β is calculated to be 0.39×(2π/d) by the FDTD calculation. Accordingly, β=0.94 $k_0$ is obtained. The same calculation as that described above provides βN=−0.87 $k_0$, and hence the equations (4) and (5) provide $\theta_a$=60°. Further, when a voltage is applied thereto, and the intensity of an electric field generated by the voltage is set to 20 V/µm, the equivalent refractive index changes by +0.38, and hence the propagation constant β is calculated to be 1.11×(2π/d) by the FDTD calculation. Accordingly, β=2.67 $k_0$ is obtained. The same calculation as that described above provides βN=0.87 $k_0$, and hence the equations (4) and (5) provide $\theta_a$=−60°. The foregoing results are shown in FIG. 10. It is found from FIG. 10 that when the applied voltage is changed from −20 V/µm to 20 V/µm, the emission angle can be changed from about −60° to about +60°, that is, by about 120°. In consideration of the foregoing together with the results of FIG. 9, at longer wavelengths of a photonic band, the electric field dependence of the equivalent refractive index becomes larger, and hence the amount of a change in equivalent refractive index with a change in electric field can be increased. Accordingly, the emission angle can be changed in a wide range.

Example 2: Production of Optical Scanning Element

1. Production of Composite Substrate

An X-cut lithium niobate substrate having a diameter of 4 inches was prepared as an electro-optical crystal substrate, and a silicon substrate having a diameter of 4 inches was prepared as a support substrate. First, amorphous silicon (a-Si) was sputtered onto the electro-optical crystal substrate to form an optical loss-suppressing layer having a thickness of 20 nm. Meanwhile, silicon oxide was sputtered onto the support substrate to form a cavity-processing layer having a thickness of 0.5 µm, and a-Si was sputtered onto the cavity-processing layer to form a joining layer having a thickness of 20 nm. Next, the surface of each of the optical loss-suppressing layer and the joining layer was subjected to CMP polishing so that the arithmetic average roughness Ra of the surface of each of the optical loss-suppressing layer and the joining layer was set to 0.3 nm or less. Next, the surfaces of the optical loss-suppressing layer and the joining layer were washed, and then the optical loss-suppressing layer and the joining layer were directly joined to each other to integrate the electro-optical crystal substrate and the support substrate with each other. The direct joining was performed as described below. In a vacuum of the order of $10^{-6}$ Pa, the joining surfaces of the electro-optical crystal substrate and the support substrate (the surfaces of the optical loss-suppressing layer and the joining layer) were irradiated with high-speed Ar neutral atom beams (acceleration voltage: 1 kV, Ar flow rate: 60 sccm) for 70 seconds. After the irradiation, the electro-optical crystal substrate and the support substrate were left standing to cool by being left for 10 minutes, and then the joining surfaces of the electro-optical crystal substrate and the support substrate were brought into contact with each other, followed by pressurization at 4.90 kN for 2 minutes. Thus, the electro-optical crystal substrate and the support substrate were joined to each other. After the joining, polishing was performed until the thickness of the electro-optical crystal substrate became 0.4 µm. Thus, a composite substrate was obtained. In the resultant composite substrate, a failure such as peeling was not observed at a joining interface.

2. Formation of Diffraction Grating

A diffraction grating was formed on the surface of the electro-optical crystal substrate of the composite substrate obtained in the above-mentioned section 1. A specific procedure was as described below. First, aluminum (Al) was formed into a film serving as a metal mask on the surface of the electro-optical crystal substrate, and a resin pattern was formed on the metal mask by a nanoimprint method. The resin pattern was formed above the portion of the electro-optical crystal substrate serving as an optical waveguide so as to have a stripe shape, which extended in a direction perpendicular to the waveguide direction of the optical waveguide and had a period of 567 nm (line/space: 283.5 nm/283.5 nm), and to have a length of 1,000 µm in the waveguide direction of the optical waveguide. Next, a metal mask of a diffraction grating pattern shape was formed by chlorine-based reactive ion etching through use of the resin pattern as a mask. Next, diffraction grating grooves each having a depth of 0.05 µm were formed by fluorine-based reactive ion etching through the metal mask of a diffraction grating pattern shape. Finally, the metal mask was removed with an Al etchant. Thus, the diffraction grating was formed on the portion of the electro-optical crystal substrate serving as the optical waveguide.

3. Formation of Electrodes

A pair of electrodes was formed on the surface of the electro-optical crystal substrate of the composite substrate obtained in the above-mentioned section 2, which had formed thereon the diffraction grating. Specifically, a resist was applied to each of the left and right end portions of the electro-optical crystal substrate, and an electrode resist pattern was formed by a photolithography process. Next, a Ti film having a thickness of 20 nm, a Pt film having a thickness of 100 nm, and a Au film having a thickness of 300 nm were sequentially formed on the surface by sputtering, and the resist was lifted off after the film formation. Thus, the electrodes were formed. A gap between the formed electrodes was 5 µm.

4. Production of Optical Scanning Element

An optical scanning element was produced from the composite substrate obtained in the above-mentioned section 3, which had formed thereon the diffraction grating and the electrodes. Specifically, the optical scanning element was produced by the following procedure. First, molybdenum (Mo) was formed into a film serving as a metal mask on the electro-optical crystal substrate. Next, a resin pattern having holes in a predetermined arrangement was formed on the metal mask by a nanoimprint method. Specifically, 10 lattice rows having holes each having a diameter of 289 nm at a period (pitch) of 425 nm in each of an optical waveguide direction and a direction perpendicular to the optical waveguide direction were formed as a hole pattern corresponding to the holes of a photonic crystal on each of the left side and right side of the metal mask. No hole was formed in the central portion thereof (the portion finally serves as an optical waveguide). Further, four holes each having a diameter of 100 μm (a pattern of through-holes for etching) were formed in corner portions (the input portion sides and output portion sides of the end portions of the left and right lattice row portions opposite to the portion serving as the optical waveguide). Next, holes corresponding to the patterns were formed in the Mo mask by etching with a Mo etchant (mixed liquid containing nitric acid, acetic acid, and phosphoric acid at a mixing ratio of 10:15:1). Next, the hole patterns and the through-holes for etching were formed in the electro-optical crystal substrate, the optical loss-suppressing layer, and the joining layer by fluorine-based reactive ion etching through the pattern-formed Mo mask. Next, the composite substrate was immersed in a buffered hydrofluoric acid (BHF) etchant so that the cavity-processing layer was removed. Thus, a cavity was formed. Further, the residue of the Mo mask was removed with the Mo etchant. Finally, the composite substrate was immersed in tetramethylammonium hydroxide (TMAH) diluted to about 10% so that the optical loss-suppressing layer and the joining layer were etched. Thus, an optical scanning element wafer was produced. The resultant optical scanning element wafer was cut into chips by dicing to provide the optical scanning elements. The optical waveguide length of each of the optical scanning elements was set to 5 mm. After the chip cutting, the input-side end surface and output-side end surface of the optical waveguide were subjected to end surface polishing.

The optical insertion loss of each of the resultant optical scanning elements (chips) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage to be applied between the electrodes of the optical scanning element was switched between ±100 V, and the pattern and emission angle of the laser light output from the optical waveguide were observed. With regard to the pattern and emission angle of the laser light, the angle of a fan and the applied voltage dependence characteristic of the emission angle were measured with a high-speed goniophotometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −60° to +600 with respect to the normal direction of the optical scanning element.

In addition, to experimentally verify the responsiveness of the optical scanning element, whether or not the element was able to scan light at a voltage of ±15 V and 50 MHz was observed. As a result, it was able to be recognized that the element was able to scan without any problem. It can be assumed that the optical scanning element according to the embodiment of the present invention can operate at a frequency of the order of gigahertz because the element depends on the responsiveness of an electro-optical effect in principle. The operation of the optical scanning element may be affected by its electrode structure.

Example 3: Production of Optical Scanning Element

1. Production of Composite Substrate, 2. Formation of Diffraction Grating

A composite substrate having formed thereon a diffraction grating was obtained in the same manner as in the sections "1. Production of Composite Substrate" and "2. Formation of Diffraction Grating" in Example 2.

3. Formation of Electrodes

Next, a pair of transparent electrodes was formed on the surface of the electro-optical crystal substrate of the resultant composite substrate. First, an aluminum-doped zinc oxide (AZO) film having a thickness of 100 nm was formed on the entire surface of the electro-optical crystal substrate by a sputtering method, and a $SiO_2$ film having a thickness of 50 nm was further formed as a protective film thereon by the method. Next, a resist was applied, and a resist mask pattern was formed on each of both the left and right sides of the diffraction grating by a photolithography process. After that, the $SiO_2$ film and the AZO film were etched by fluorine-based reactive ion etching to form a transparent electrode pattern. Finally, the resist mask was removed with acetone. A gap between the formed electrodes was 1 μm.

4. Production of Optical Scanning Element

An optical scanning element was produced from the composite substrate obtained in the above-mentioned section 3, which had formed thereon the diffraction grating and the transparent electrodes. Specifically, the optical scanning element was produced by the following procedure. First, molybdenum (Mo) was formed into a film serving as a metal mask on the transparent electrodes and the electro-optical crystal substrate. Next, a resin pattern having holes in a predetermined arrangement was formed on the metal mask by a nanoimprint method. Specifically, 10 lattice rows having holes each having a diameter of 289 nm at a period (pitch) of 425 nm in each of an optical waveguide direction and a direction perpendicular to the optical waveguide direction were formed as a hole pattern corresponding to the holes of a photonic crystal on each of the left side and right side of the metal mask. No hole was formed in the central portion thereof (the portion finally serves as an optical waveguide). Further, four holes each having a diameter of 100 μm (a pattern of through-holes for etching) were formed in corner portions (the input portion sides and output portion sides of the end portions of the left and right lattice row portions opposite to the portion serving as the optical waveguide). Next, holes corresponding to the patterns were formed in the Mo mask by etching with a Mo etchant (mixed liquid containing nitric acid, acetic acid, and phosphoric acid at a mixing ratio of 10:15:1). Next, the hole patterns and the through-holes for etching were formed in the transparent electrodes, the electro-optical crystal substrate, the optical loss-suppressing layer, and the joining layer by fluorine-based reactive ion etching through the pattern-formed Mo mask. Next, the composite substrate was immersed in a buffered hydrofluoric acid (BHF) etchant so that the cavity-processing layer was removed. Thus, a cavity was formed. Further, the residue of the Mo mask was removed with the Mo etchant. Finally, the composite substrate was immersed in tetramethylammonium hydroxide (TMAH) diluted to about 10% so that the optical loss-suppressing layer and the joining layer were etched. Thus, an optical scanning element wafer was produced. The resultant optical scanning element wafer was cut into chips by dicing to provide the optical scanning elements. The optical waveguide length of each of the optical scanning elements was set to 5 mm. After the chip cutting, the input-side end surface and output-side end surface of the optical waveguide were subjected to end surface polishing.

The optical insertion loss of each of the resultant optical scanning elements (chips) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage to be applied between the electrodes of the optical scanning element was switched between ±25 V, and the pattern and emission angle of the laser light output from the optical waveguide were observed. With regard to the pattern and emission angle of the laser light, the angle of a fan and the applied voltage dependence characteristic of the emission angle were measured with a high-speed gonio-photometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −60° to +600 with respect to the normal direction of the optical scanning element.

In addition, to experimentally verify the responsiveness of the optical scanning element, whether or not the element was able to scan light at a voltage of ±4 V and 50 MHz was observed. As a result, it was able to be recognized that the element was able to scan without any problem. It can be assumed that the optical scanning element according to the embodiment of the present invention can operate at a frequency of the order of gigahertz because the element depends on the responsiveness of an electro-optical effect in principle. The operation of the optical scanning element may be affected by its electrode structure.

Comparative Example 1: Production of Optical Scanning Element

Optical scanning elements (chips) were produced in the same manner as in Example 2 except that: a silicon substrate was used instead of the X-cut lithium niobate substrate (electro-optical crystal substrate); and the hole diameter and period of the substrate were set to 204 nm and 300 nm, respectively. Each of the resultant optical scanning elements was subjected to the same evaluations as those of Example 2. As a result, the propagation loss of the optical waveguide of the element was 0.5 dB/cm. Further, laser light output from the optical waveguide was a so-called fan beam shape that was a line shape in plan view and was a fan shape when viewed from the optical waveguide direction, and the angle of the fan (the spread angle of the fan) was 30°. In addition, even when a voltage to be applied to the optical scanning element was changed, the emission angle of the laser light did not change.

INDUSTRIAL APPLICABILITY

The optical scanning element according to the embodiment of the present invention may be used as a so-called scanner in a wide range. The optical scanning element is used as, for example, a laser radar, a laser scanner, or LIDAR, and may be applied to an obstacle-detecting system or a ranging system for the automatic operation control of an automobile or for the position control of a robot or a drone.

What is claimed is:

1. An optical scanning element, comprising:
 a photonic crystal layer having holes periodically formed in an electro-optical crystal substrate;
 a line-defect optical waveguide formed in the photonic crystal layer;
 a diffraction grating arranged in at least one portion selected from an upper portion, a left side surface portion, and a right side surface portion of the line-defect optical waveguide; and
 electrodes arranged on a left side and a right side of the line-defect optical waveguide,
 wherein the optical scanning element is configured so that an emission angle of light emitted from an upper surface of the line-defect optical waveguide is changed,
 wherein the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

2. The optical scanning element according to claim 1, further comprising:
 a support substrate arranged below the electro-optical crystal substrate, the support substrate being configured to support the electro-optical crystal substrate;
 a joining portion configured to integrate the electro-optical crystal substrate and the support substrate with each other; and
 a cavity defined by a lower surface of the electro-optical crystal substrate, an upper surface of the support substrate, and the joining portion.

3. The optical scanning element according to claim 1, further comprising a clad layer arranged on an upper surface of the photonic crystal layer, wherein the diffraction grating is arranged in a portion on an upper surface of the clad layer corresponding to the line-defect optical waveguide.

4. The optical scanning element according to claim 1, wherein the diffraction grating has a plurality of grating grooves extending in a direction substantially perpendicular to a waveguide direction of the line-defect optical waveguide.

5. The optical scanning element according to claim 1, wherein the line-defect optical waveguide has a length of 5 mm or less.

6. The optical scanning element according to claim 1, wherein the electrodes are transparent to light, and are arranged above the photonic crystal layer so as to overlap the holes.

7. An optical scanning element, comprising:
- a photonic crystal layer having holes periodically formed in an electro-optical crystal substrate;
- a line-defect optical waveguide formed in the photonic crystal layer;
- a diffraction grating arranged in at least one portion selected from an upper portion, a left side surface portion, and a right side surface portion of the line-defect optical waveguide;
- electrodes arranged on a left side and a right side of the line-defect optical waveguide;
- a support substrate arranged below the electro-optical crystal substrate, the support substrate being configured to support the electro-optical crystal substrate;
- a joining portion configured to integrate the electro-optical crystal substrate and the support substrate with each other;
- a cavity defined by a lower surface of the electro-optical crystal substrate, an upper surface of the support substrate, and the joining portion; and
- a clad layer arranged on an upper surface of the photonic crystal layer,
- the optical scanning element being configured so that an emission angle of light emitted from an upper surface of the line-defect optical waveguide is changed,
- wherein the diffraction grating is arranged in a portion on an upper surface of the clad layer corresponding to the line-defect optical waveguide, wherein the diffraction grating has a plurality of grating grooves extending in a direction substantially perpendicular to a waveguide direction of the line-defect optical waveguide,
- wherein the line-defect optical waveguide has a length of 5 mm or less,
- wherein the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate,
- wherein the electrodes are transparent to light, and are arranged above the photonic crystal layer so as to overlap the holes.

* * * * *